United States Patent
Williams et al.

(10) Patent No.: US 9,711,269 B2
(45) Date of Patent: Jul. 18, 2017

(54) TORQUE MOTOR ACTUATOR WITH AN ARMATURE STOP

(71) Applicant: HONEYWELL INTERNATIONAL INC., Morristown, NJ (US)

(72) Inventors: James Williams, New Carlisle, IN (US); Douglas Klontz, South Bend, IN (US); Dan Carter, South Bend, IN (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 727 days.

(21) Appl. No.: 14/150,342

(22) Filed: Jan. 8, 2014

(65) Prior Publication Data
US 2015/0194252 A1    Jul. 9, 2015

(51) Int. Cl.
| | |
|---|---|
| H02K 16/04 | (2006.01) |
| H01F 7/124 | (2006.01) |
| H02K 1/27 | (2006.01) |
| H02K 21/24 | (2006.01) |
| H02K 16/00 | (2006.01) |
| H01F 7/14 | (2006.01) |
| H02K 26/00 | (2006.01) |

(52) U.S. Cl.
CPC .............. *H01F 7/124* (2013.01); *H01F 7/14* (2013.01); *H02K 1/2793* (2013.01); *H02K 16/00* (2013.01); *H02K 16/04* (2013.01); *H02K 21/24* (2013.01); *H02K 26/00* (2013.01)

(58) Field of Classification Search
CPC ........ H02K 16/00; H02K 16/04; H02K 21/24; H02K 26/00; H02K 1/2793
See application file for complete search history.

(56) References Cited

U.S. PATENT DOCUMENTS

| | | | | |
|---|---|---|---|---|
| 4,523,167 A | * | 6/1985 | Remington | H01F 7/145 335/230 |
| 4,629,920 A | * | 12/1986 | Hermann | H02K 21/24 310/156.29 |
| 5,225,770 A | * | 7/1993 | Montagu | H02K 26/00 324/146 |
| 5,518,219 A | | 5/1996 | Wenzel et al. | |
| 5,907,199 A | * | 5/1999 | Miller | H02K 16/04 310/112 |
| 5,945,766 A | * | 8/1999 | Kim | H02K 16/00 310/268 |
| 6,198,369 B1 | | 3/2001 | Ward et al. | |

(Continued)

*Primary Examiner* — Dang D Le
(74) *Attorney, Agent, or Firm* — Lorenz & Kopf, LLP

(57) ABSTRACT

A torque motor actuator includes a first magnetic pole piece, a second magnetic pole piece, an armature, and an armature stop. The second magnetic pole piece is spaced apart from the first magnetic pole piece to define an armature gap. The armature is disposed in the armature gap and is spaced apart from the first and second magnetic pole pieces. The armature includes a magnetically permeable material and has a central portion, a first arm, and a second arm. The armature is rotationally mounted at the central portion, and the first and second arms extend, in opposite directions, from the central portion. The armature stop extends from the first arm, and comprises a non-magnetic material. The armature stop is configured, upon rotation of the armature, to selectively engage one of the first or second magnetic pole pieces to thereby limit armature rotation.

15 Claims, 2 Drawing Sheets

(56) References Cited

U.S. PATENT DOCUMENTS

| | | | | |
|---|---|---|---|---|
| 7,268,449 B2* | 9/2007 | Suzuki | ................ | F16H 25/2015 |
| | | | | 310/12.26 |
| 8,872,395 B2* | 10/2014 | Tbatou | .................... | H02K 5/04 |
| | | | | 310/156.35 |
| 8,957,554 B2* | 2/2015 | Hata | ...................... | H02K 37/14 |
| | | | | 310/112 |
| 2003/0075769 A1* | 4/2003 | Brown | .................... | F16C 19/52 |
| | | | | 257/422 |
| 2003/0141475 A1 | 7/2003 | Ruthardt et al. | | |
| 2013/0154406 A1* | 6/2013 | Yun | ........................ | H02K 7/083 |
| | | | | 310/49.43 |
| 2014/0218143 A1* | 8/2014 | Gruden | ................. | H02K 26/00 |
| | | | | 335/229 |

* cited by examiner

TORQUE MOTOR ACTUATOR WITH AN ARMATURE STOP

TECHNICAL FIELD

The present invention generally relates to torque motor actuators, and more particularly relates to a torque motor actuator that includes an armature stop.

BACKGROUND

Torque motor actuators are used in myriad systems and environments. For example, many valves associated with an aircraft gas turbine engine are controlled using torque motor actuators. No matter the specific end-use system and environment, a typical torque motor actuator includes a plurality of magnets, a plurality of magnetic pole pieces, a plurality of coils, an armature, and a lever. The coils are controllably energized to generate a magnetic force that is transmitted through the pole pieces and across air gaps into which portions of the armature extend. The magnetic force acts on and controls the rotational position of the armature. By controlling the rotational position of the armature, the position of a lever, a valve element, or other device, is controlled.

In many instances, the air gaps between the magnetic pole pieces and the armature are of a distance that is greater than the structural capability of the armature support geometry. Additionally, if the armature gets too close to a pole piece, the armature may undesirably latch to the pole piece. For these reasons, along with calibration considerations, the armature rotational displacement is limited.

Presently, armature rotational displacement is limited by incorporating non-magnetic stops into one or both sides of one of the magnetic pole pieces, usually the upper pole piece. Typically, two stops are used to limit the rotational displacement in each direction. These stops are typically implemented using threaded stop screws that are threaded into the pole piece, and onto which jam nuts are threaded. Typically, after the stop distance is set, a wicking anaerobic sealant is applied to the threaded stops and jam nuts to prevent any unintended movement thereof.

Presently known armature stops are generally effective, but do exhibit certain drawbacks. For example, these known stops may exhibit relatively high manufacturing, procurement, and calibration cost. In particular, the stop screws need to be of a small diameter to limit the amount of magnetic material removed from the pole piece, and have a relatively high length-to-diameter ratio, creating manufacturing challenges for the screw and the threaded hole in the pole piece. In addition to the long thread length, the magnetic material of the pole piece can be difficult to tap. Moreover, the adjustment and locking of the stop screws, via the lock nuts and wicking anaerobic sealant, can be difficult and costly.

Hence, there is a need for a torque motor actuator that includes an armature stop that is not costly to manufacture and/or calibrate. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a torque motor actuator includes a first magnetic pole piece, a second magnetic pole piece, an armature, and an armature stop. The second magnetic pole piece is spaced apart from the first magnetic pole piece to define an armature gap. The armature is disposed in the armature gap and is spaced apart from the first and second magnetic pole pieces. The armature includes a magnetically permeable material and has a central portion, a first arm, and a second arm. The armature is rotationally mounted at the central portion, and the first and second arms extend, in opposite directions, from the central portion. The armature stop extends from the first arm, and comprises a non-magnetic material. The armature stop is configured, upon rotation of the armature, to selectively engage one of the first or second magnetic pole pieces to thereby limit armature rotation.

In another embodiment, torque motor actuator includes a first magnetic pole piece, a second magnetic pole piece, an armature, a first coil, a second coil, and an armature stop. The second magnetic pole piece is spaced apart from the first magnetic pole piece to define an armature gap. The armature is disposed in the armature gap and is spaced apart from the first and second magnetic pole pieces. The armature comprises a magnetically permeable material and includes a central portion, a first arm, and a second arm. The armature is rotationally mounted at the central portion, and the first and second arms extend, in opposite directions, from the central portion. The first coil surrounds at least a portion of the first arm and is adapted to receive a first current, and the second coil surrounds at least a portion of the second arm and is adapted to receive a second current. The armature stop extends from the first arm, and comprises a non-magnetic material. The armature stop is configured, upon rotation of the armature, to selectively engage one of the first or second magnetic pole pieces to thereby limit armature rotation. The first and second coils are configured, upon receipt of the first and second current, respectively, to generate a magnetic force that causes the armature to rotate.

In yet another embodiment, a torque motor actuator includes a first magnetic pole piece, a second magnetic pole piece, an armature, an opening, and an armature stop. The second magnetic pole piece is spaced apart from the first magnetic pole piece to define an armature gap. The armature is disposed in the armature gap and is spaced apart from the first and second magnetic pole pieces. The armature comprises a magnetically permeable material and includes a central portion, a first arm, and a second arm. The armature is rotationally mounted at the central portion, and the first and second arms extend, in opposite directions, from the central portion. The opening extends through the first arm. The armature stop is disposed in the opening and extends from the first arm. The armature stop comprises a non-magnetic material and is configured, upon rotation of the armature, to selectively engage one of the first or second magnetic pole pieces to thereby limit armature rotation.

Furthermore, other desirable features and characteristics of the torque motor actuator and valve will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
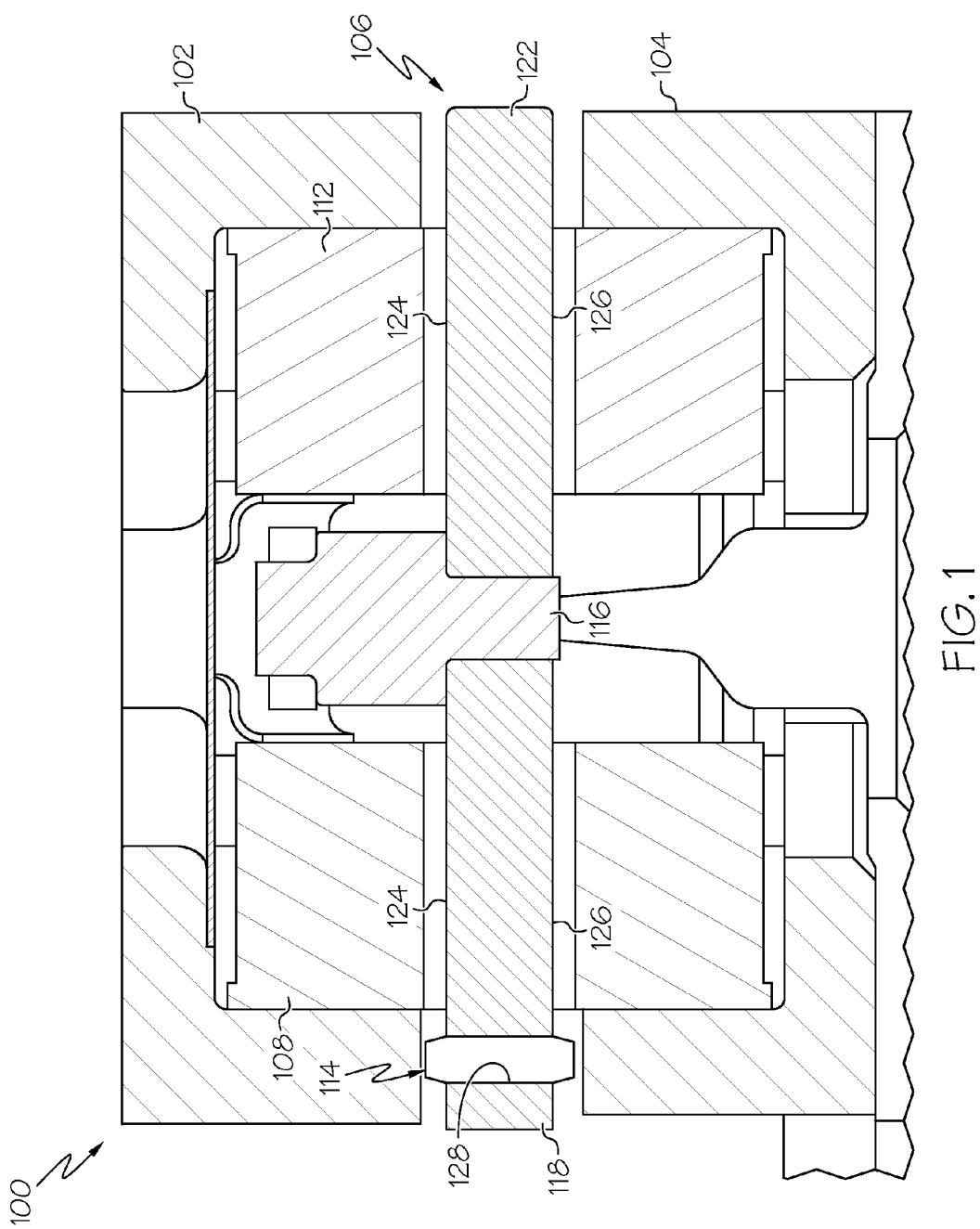
FIG. 1 depicts a cross section view of one embodiment of a torque motor actuator assembly.

Referring to FIG. 1, a cross section view of one embodiment of a torque motor actuator assembly 100 is depicted. The torque motor actuator 100 includes a first magnetic pole piece 102, a second magnetic pole piece 104, an armature 106, a first coil 108, a second coil 112, and an armature stop 114. The first and second magnetic pole pieces 102, 104 are of opposite magnetic polarities, and are spaced apart from each other to define a gap. For example, if the first magnetic pole piece 102 is of a north (N) magnetic polarity, then the second magnetic pole piece 104 is of a south (S) magnetic polarity, and vice-versa.

It will be appreciated that the first and second magnetic pole pieces 102, 104 may be variously configured and implemented. For example, the first and second magnetic pole pieces 102, 104 may be coupled to, or form part of, a single permanent magnet. Alternatively, the first and second magnetic pole pieces 102, 104 may be coupled to, or form part of, separate magnets. For example, the first magnetic pole piece 102 may be coupled to, or form part of, a first permanent magnet, and the second magnetic pole piece 104 may be coupled to, or form part of, a second permanent magnet.

Regardless of the specific number, configuration, and implementation of magnetic pole pieces 102, 104, the armature 106 is disposed in the armature gap and is spaced apart from the first and second magnetic pole pieces 102, 104. The depicted armature 106 is preferably formed of a magnetically permeable material and includes a central portion 116, a first arm 118, and a second arm 122. The central portion 116 may be formed integrally with the first and second arms 118, 112 or separately therefrom. The first and second arms 118, 122 each include a first side 124 and a second side 126, with the first sides 124 facing the first magnetic pole piece 102 and the second sides 126 facing the second magnetic pole piece 104. The armature 106 is rotationally mounted at the central portion 116, and the first and second arms 118, 122 extend in opposite directions from the central portion 116.

The first coil 108 surrounds at least a portion of the first arm 118 and is disposed between the first and second magnetic pole pieces 102, 104. The second coil 112 surrounds at least a portion of the second arm 122 and is also disposed between the first and second magnetic pole pieces 102, 104. The first and second coils 108, 112 are also adapted to receive electrical currents. In particular, the first coil 108 is adapted to receive a first current ($i_1$), and the second coil 112 is adapted to receive a second current ($i_2$). The first and second coils 108, 112 are configured, upon receipt of the first and second current, respectively, to generate a magnetic force that causes the armature 106 to rotate. As may be appreciated, the direction of the first and second currents through the first and second coils 108, 112 will determine the direction of the magnetic force, and thus the direction in which the armature 106 rotates.

The armature stop 114 is coupled to the armature 106 and extends from one of the arms 118 or 122. In the depicted embodiment, the armature stop 114 extends from the first arm 118, but in other embodiments it may extend from the second arm 122. Regardless of the particular arm it extends from, the armature stop 114 is preferably formed of a non-magnetic material and extends from the first and second sides of the armature 106. The armature stop 114 is configured, upon rotation of the armature 106, to selectively engage one of the first or second magnetic pole pieces 102, 104 to thereby limit armature rotation.

The armature stop 114 may be variously configured and implemented to limit armature rotation. For example, it may be formed as an integral part of the armature 106, or it may be formed separate from the armature 106 and then coupled thereto. In the exemplary embodiments depicted in FIGS. 1 and 2, the armature stop 114 is formed separate from the armature 106. Thus, in these embodiments the armature 106 additionally includes an opening 128 in the first arm 118 that extends between the first and second sides 124, 126.

In the embodiment depicted in FIG. 1, the armature stop 114 is a pin that is press fit into the opening 128. The length of the pin 114 may be controlled to achieve the total amount of armature rotation. The position of the pin 114 in the armature 106 controls the rotational displacement in each direction. It will be appreciated that non-illustrated fixtures could be used to position the pin 114 in the armature 106, significantly reducing calibration time required for a given application.

Figure 2:
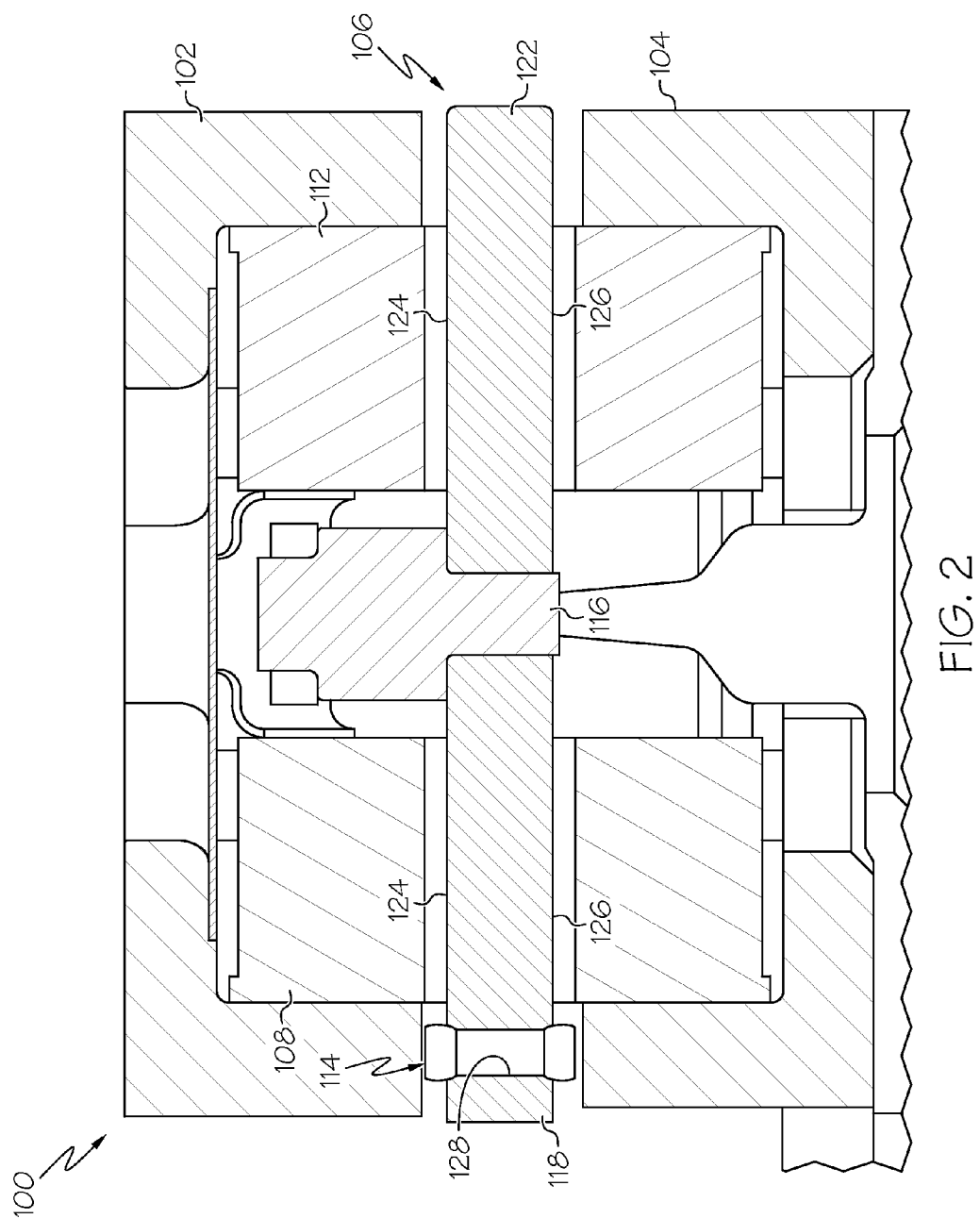
FIG. 2 depicts a cross section view of another embodiment of a torque motor actuator assembly.

In the embodiment depicted in FIG. 2, the armature stop 114 is a rivet that is disposed in the opening 128. The rivet 114 is preferably formed of a non-magnetic ductile material that is conducive to riveting. Some non-limiting examples include various aluminum alloys, and 300 Series CRES, just to name a few. The ends of the rivet 114 are preferably controlled, via a non-illustrated fixture, to limit armature rotation in either direction, significantly reducing calibration time required for a given application. A headed rivet could also be used, with the head thickness being chosen to limit armature rotational displacement.

The torque motor actuator disclosed herein includes an armature stop that is not costly to manufacture and/or calibrate.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A torque motor actuator, comprising:
a first magnetic pole piece;
a second magnetic pole piece spaced apart from the first magnetic pole piece to define an armature gap;
an armature disposed in the armature gap and spaced apart from the first and second magnetic pole pieces, the armature comprising a magnetically permeable material and including a central portion, a first arm, and a second arm, the armature rotationally mounted at the central portion to rotate about a rotational axis, the first and second arms extending, in opposite directions, from the central portion and perpendicular to the rotational axis; and
an armature stop extending from the first arm, the armature stop comprising a non-magnetic material and configured, upon rotation of the armature, to selectively engage one of the first or second magnetic pole pieces to thereby limit armature rotation,
wherein:
the first arm includes a first side and a second side;
the first side faces the first magnetic pole piece;
the second side faces the second magnetic pole piece; and
the armature stop extends from the first and second sides.

2. The actuator of claim 1, further comprising:
a first coil surrounding at least a portion of the first arm and adapted to receive a first current; and
a second coil surrounding at least a portion of the second arm and adapted to receive a second current.

3. The actuator of claim 2, wherein the first and second coils are configured, upon receipt of the first and second current, respectively, to generate a magnetic force that causes the armature to rotate.

4. The actuator of claim 1, wherein the first arm includes an opening extending between the first and second sides.

5. The actuator of claim 4, wherein the armature stop comprises a pin that is press fit into the opening.

6. The actuator of claim 4, wherein the armature stop comprises a rivet that is disposed in the opening.

7. A torque motor actuator, comprising:
a first magnetic pole piece;
a second magnetic pole piece spaced apart from the first magnetic pole piece to define an armature gap;
an armature disposed in the armature gap and spaced apart from the first and second magnetic pole pieces, the armature comprising a magnetically permeable material and including a central portion, a first arm, and a second arm, the armature rotationally mounted at the central portion to rotate about a rotational axis, the first and second arms extending, in opposite directions, from the central portion and perpendicular to the rotational axis; and
a first coil surrounding at least a portion of the first arm and adapted to receive a first current; and
a second coil surrounding at least a portion of the second arm and adapted to receive a second current; and
an armature stop extending from the first arm, the armature stop comprising a non-magnetic material and configured, upon rotation of the armature, to selectively engage one of the first or second magnetic pole pieces to thereby limit armature rotation,
wherein:
the first and second coils are configured, upon receipt of the first and second current, respectively, to generate a magnetic force that causes the armature to rotate;
the first arm includes a first side and a second side;
the first side faces the first magnetic pole piece;
the second side faces the second magnetic pole piece; and
the armature stop extends from the first and second sides.

8. The actuator of claim 7, wherein the first arm includes an opening extending between the first and second sides.

9. The actuator of claim 8, wherein the armature stop comprises a pin that is press fit into the opening.

10. The actuator of claim 8, wherein the armature stop comprises a rivet that is disposed in the opening.

11. A torque motor actuator, comprising:
a first magnetic pole piece;
a second magnetic pole piece spaced apart from the first magnetic pole piece to define an armature gap;
an armature disposed in the armature gap and spaced apart from the first and second magnetic pole pieces, the armature comprising a magnetically permeable material and including a central portion, a first arm, and a second arm, the armature rotationally mounted at the central portion to rotate about a rotational axis, the first and second arms extending, in opposite directions, from the central portion and perpendicular to the rotational axis;
an opening extending through the first arm; and
an armature stop disposed in the opening and extending from the first arm, the armature stop comprising a non-magnetic material and configured, upon rotation of the armature, to selectively engage one of the first or second magnetic pole pieces to thereby limit armature rotation,
wherein:
the first arm includes a first side and a second side;
the first side faces the first magnetic pole piece;
the second side faces the second magnetic pole piece; and
the armature stop extends from the first and second sides.

12. The actuator of claim 11, further comprising:
a first coil surrounding at least a portion of the first arm and adapted to receive a first current; and
a second coil surrounding at least a portion of the second arm and adapted to receive a second current.

13. The actuator of claim 11, wherein the first and second coils are configured, upon receipt of the first and second current, respectively, to generate a magnetic force that causes the armature to rotate.

14. The actuator of claim 11, wherein the armature stop comprises a pin that is press fit into the opening.

15. The actuator of claim 11, wherein the armature stop comprises a rivet that is disposed in the opening.

* * * * *